(12) United States Patent
Alam et al.

(10) Patent No.: US 7,554,920 B2
(45) Date of Patent: *Jun. 30, 2009

(54) METHOD AND SYSTEM FOR DYNAMICALLY ADJUSTING TRANSMIT AND RECEIVE PARAMETERS FOR HANDLING NEGATIVE ACKNOWLEDGMENTS IN RELIABLE MULTICAST

(75) Inventors: Mohammad Shabbir Alam, Bellevue, WA (US); Pradeep Bahl, Redmond, WA (US); Shirish R. Koti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

This patent is subject to a terminal disclaimer.

(21) Appl. No.: 11/072,023

(22) Filed: Mar. 4, 2005

(65) Prior Publication Data

US 2005/0147045 A1    Jul. 7, 2005

Related U.S. Application Data

(63) Continuation of application No. 10/034,430, filed on Dec. 27, 2001, now Pat. No. 7,035,258.

(51) Int. Cl.
*H04J 1/16* (2006.01)
*H04J 3/14* (2006.01)
*H04B 1/44* (2006.01)
*H04L 12/28* (2006.01)
*H04L 12/56* (2006.01)
*H04J 3/26* (2006.01)

(52) U.S. Cl. ............. 370/236; 370/282; 370/389; 370/392; 370/394; 370/432

(58) Field of Classification Search ............ 370/390, 370/235, 278, 312, 394, 408, 412, 445, 447, 370/448, 236, 282, 432; 709/235; 714/748; 445/422.1
See application file for complete search history.

(56) References Cited

U.S. PATENT DOCUMENTS 6,078,568 A * 6/2000 Wright et al. ............... 370/312

(Continued)

OTHER PUBLICATIONS

Floyd Sally, "*A Reliable Multicast Framework for Light-weight Sessions and Application Level Framing*" IEEE/ACM Transactions on Networking, vol. 5, No. 6 Dec. 1997.

(Continued)

*Primary Examiner*—Chi H Pham
*Assistant Examiner*—Farah Faroul
(74) *Attorney, Agent, or Firm*—Wolf, Greenfield & Sacks, P.C.

(57) ABSTRACT

A method and system for multicast network transmissions dynamically sets response time parameters for handling negative acknowledgments (NAKs). When the sender receives a NAK for a lost packet, it returns an NAK confirmation (NCF), waits for a back-off time before sending requested repair data, and then waits for a "linger time" during which the sender does not respond to other NAKs for the same lost packet. The back-off time and the linger time are dynamically set according to the position of the requested sequence number in the sender's transmit window such that the back-off time is shorter when the requested data is closer to being flushed out of the transmit window. After receiving the NCF, the receiver waits for a timeout period and resends the NAK if no repair data is received. The timeout period for data receipt is dynamically set according to a statistical average time for receiving repair data from the sender and the estimated sender's transmit window size.

13 Claims, 6 Drawing Sheets

U.S. PATENT DOCUMENTS

| | | | |
|---|---|---|---|
| 6,112,323 A * | 8/2000 | Meizlik et al. | 714/748 |
| 6,240,092 B1 * | 5/2001 | Monch | 370/408 |
| 6,335,933 B1 * | 1/2002 | Mallory | 370/394 |
| 6,466,785 B1 * | 10/2002 | Chambert et al. | 455/422.1 |
| 6,581,175 B1 * | 6/2003 | Crump et al. | 714/748 |
| 6,693,907 B1 * | 2/2004 | Wesley et al. | 370/390 |
| 6,697,365 B1 * | 2/2004 | Messenger | 370/390 |
| 6,807,578 B2 * | 10/2004 | Satran et al. | 709/235 |
| 6,975,599 B1 * | 12/2005 | Johnson et al. | 370/278 |
| 7,020,714 B2 * | 3/2006 | Kalyanaraman et al. | 709/235 |
| 7,035,258 B2 * | 4/2006 | Alam et al. | 370/390 |
| 2003/0053469 A1 * | 3/2003 | Wentink | 370/412 |
| 2003/0179707 A1 * | 9/2003 | Bare | 370/235 |

OTHER PUBLICATIONS

Speakman et al, "*PGM Reliable Transport Protocol Specification*" www.ietf.org. <draft-speakman-pgm-spec-06.txt> printed Feb. 3, 2003.

Petrova et al., "*Pragmatic General Multicast (PGM) Reliable Transport Protocol Management Information Base (MIB)*" ,<draft-petrova-pgmmib-00.txt>, Nov. 2000, pp. 1-80.

* cited by examiner

METHOD AND SYSTEM FOR DYNAMICALLY ADJUSTING TRANSMIT AND RECEIVE PARAMETERS FOR HANDLING NEGATIVE ACKNOWLEDGMENTS IN RELIABLE MULTICAST

RELATED APPLICATION

This application is a continuation of the coassigned and copending U.S. patent application Ser. No. 10/034,430, filed on Dec. 27, 2001, and entitled "Method and System for Dynamically Adjusting Transmit and Receive Parameters for Handling Negative Acknowledgements in Reliable Multicast." Priority is hereby claimed to this case under 35 U.S.C. § 120.

TECHNICAL FIELD OF THE INVENTION

This invention relates generally to network communications, and more particularly to the reliable delivery of multicast transmissions.

BACKGROUND OF THE INVENTION

Conventional network communications are typically transmitted from a sender to a single receiver. This mode of point-to-point network communication is often referred to as "unicast." Reliable data delivery in the unicast mode across an unreliable network, such as the Internet, is conventionally achieved through an end-to-end transport protocol, such as the TCP, in which the sender implicitly or explicitly solicits receipt information from the receiver. In the unicast mode, even though multiple clients on the network may request the same data from the sender at the same time, duplicate data streams are transmitted, one to each client.

In contrast, in a "multicast" transmission, a sender sends a message to multiple recipients at the same time. One of the most important advantages of multicast over unicast is that multicast conserves bandwidth of the sender and the network by sending a single stream of data to a group multicast address. This advantage is especially important for applications such as multiparty conferencing or broadcasting live multimedia events over the network, where the bandwidth requirements can be significant. Although multicasting is not a new concept, network communications in the multicast mode over computer networks, especially the Internet, have only recently become common. This is partly due to that today's networks are originally designed to reliably transmit data from point to point, i.e., in the unicast mode, and multicast operations require the establishment of effective protocols for handling the delivery of multicast packets and the implementation of the required network infrastructure to support the multicast transmissions.

A major consideration in designing a multicast framework is the reliability of the delivery of multicast packets over an unreliable network to a potentially large group of receivers, the group membership of which may not even be known to the sender. To achieve reliable multicast delivery, loss detection and recovery must be properly handled. Various frameworks have been proposed to address the issue of reliable delivery of multicast data. See, e.g., Sally Floyd, Van Jacobson, Ching-Gung Liu, Steven McCanne, and Lixia Zhang, "A Reliable Multicast Framework for Light-weight Sessions and Application Level Framing," IEEE/ACM Transactions On Networking, December 1997.

In one implementation based on the Pragmatic General Multicast (PGM) protocol, which is described in an IETF draft entitled "PGM Reliable Transport Protocol Specification," each receiver in the multicast group takes the responsibility for loss detection and recovery. According to the PGM protocol, a source or sender multicasts sequentially numbered data packets, which are called "original data" (ODATA). The sequential numbering of the ODATA packets enables a multicast receiver to determine whether any packet is lost in transit. In contrast to the conventional unicast scheme that requires "positive" acknowledgments for received packets, the receiver in the PGM network sends to the source "negative" acknowledgments (NAKs) identifying packets detected to be missing from the expected sequence. When the sender receives an NAK, it first multicasts an "NAK confirmation" {NCF} packet and then multicasts the data identified in the NAK in repair data (RDATA) packets. After receiving the NCF, the receiver waits for the RDATA. The RDATA, of course, may also be lost in transit. If after a while the RDATA is still not received, the receiver repeats its attempt to get the lost data by sending the NAK again.

The timing for the sender to send out the RDATA and the timing for the receiver to resend the NAK can greatly impact the efficiency and effectiveness of this scheme for reliable multicast delivery. The PGM protocol, however, does not explicitly define such timing requirements. Accordingly, there is a need for a way for use in a reliable multicast scheme based on the PGM protocol or similar protocols to set time parameters for a sender to send RDATA packets and for a receiver to resend NAKs.

SUMMARY OF THE INVENTION

In view of the foregoing, the present invention provides a method and system for multicast network transmission that dynamically sets the time parameters for a multicast sender and a receiver to handle negative acknowledgments (NAKs) for lost packets. The sender sends a multicast transmission having a plurality of data packets over a network to the receiver. When the receiver receives the multicast transmission, it determines whether there are packets missing from the transmission. If a packet is lost in transit, the receiver sends a negative acknowledgment (NAK) to the sender identifying the sequence number of the lost packet. When the sender receives a NAK, it first checks to see if it has received a NAK recently for the same sequence number or not. If this is the first NAK for that sequence number, the sender returns a NAK confirmation (NCF) and waits for a back-off time before sending the repair data (RDATA), and then waits for a linger time during which the sender does not respond to other NAKs for the same lost packet. The lengths of the back-off time and the linger time are set dynamically according to the position of the sequence number of the requested packet in a transmit window maintained by the sender for storing transmitted data for repairs such that the back-off time is reduced when the requested data is closer to being flushed out of the transmit window.

On the receiver side, after receiving a matching NAK confirmation (NCF), the receiver waits for the repair data corresponding to the NAK for a timeout period before resending the NAK. The length of this timeout period is dynamically set according to a statistical average time for the receiver to receive repair data from the sender and the sender's window size in terms of transmission time. The receiver estimates the sender's window size when that information is not directly available to the receiver.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
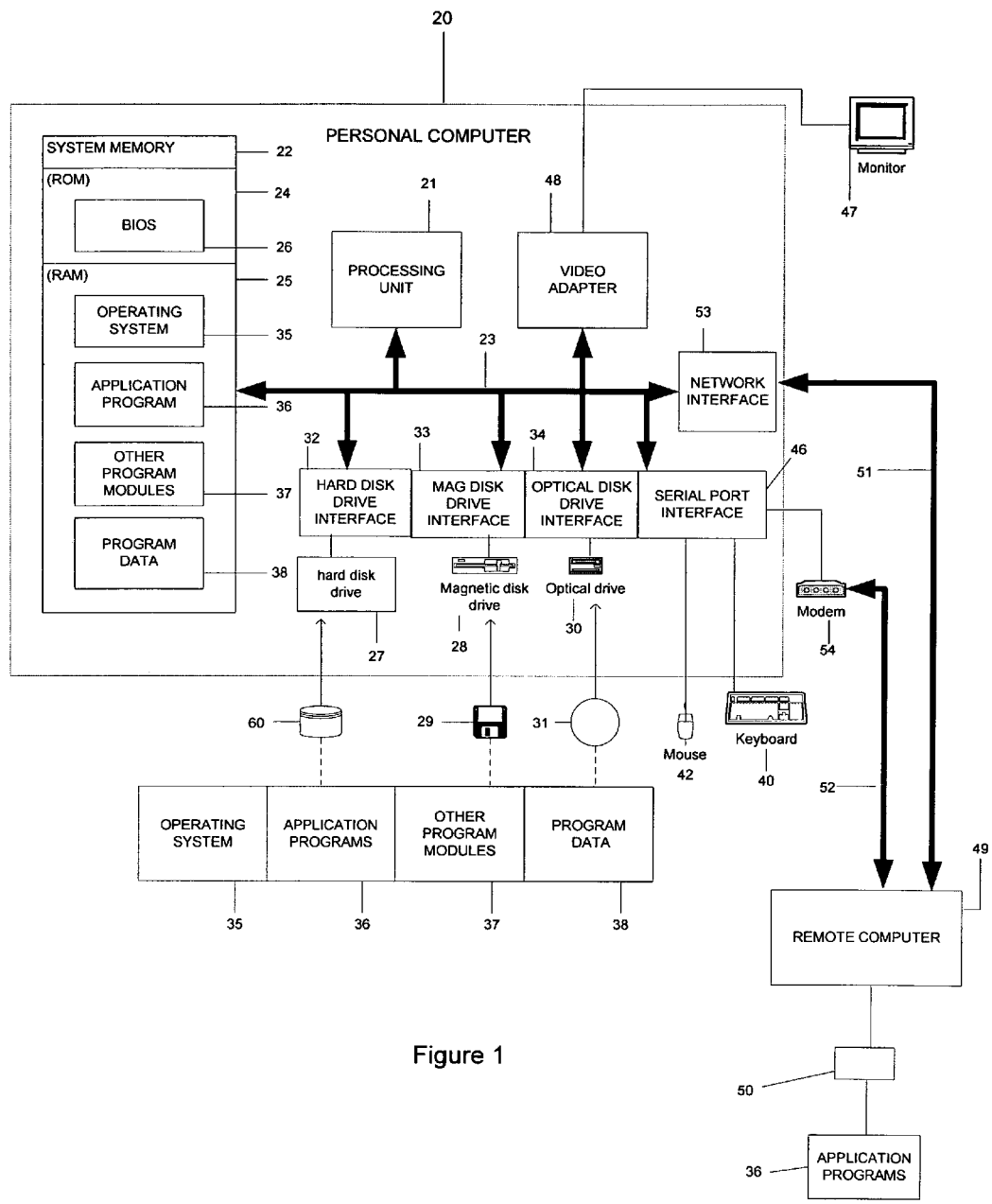
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2-7. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
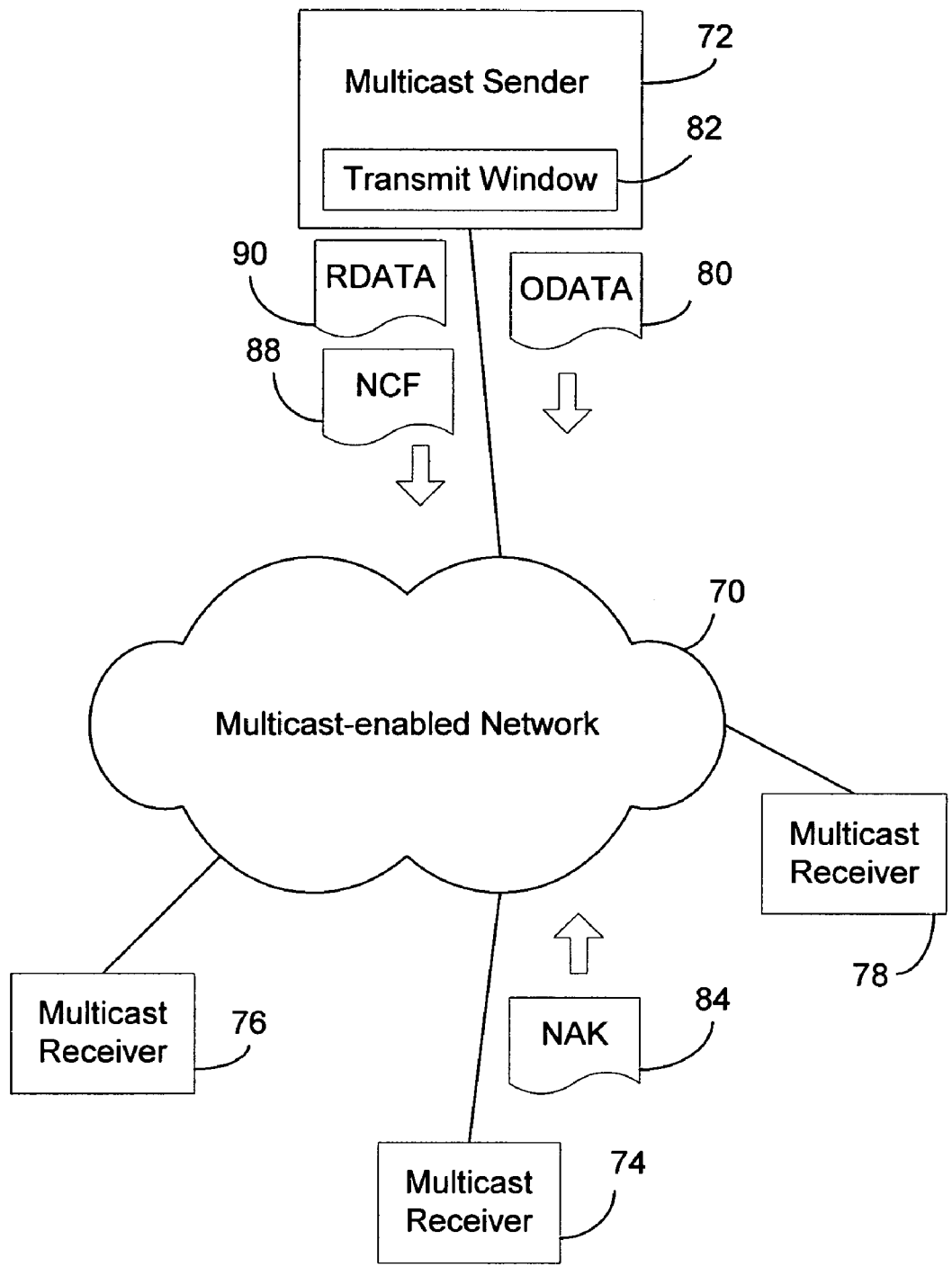
FIG. 2 is a schematic diagram showing a network having a sender of a multicast transmission and multiple receivers of the multicast transmission.

Referring now to FIG. 2, the present invention is directed to a scheme for enhancing the efficiency of reliable delivery of multicast transmissions over a multicast-enabled network 70 by dynamically adjusting time parameters involved in handling lost packets. As illustrated in FIG. 2, a sender 72 is connected by the multicast-enabled network to a plurality of receivers 74, 76, and 78. For illustration purposes, only three receivers are shown. The sender transmits "original data" (ODATA) packets 80 in the multicast mode over the network to the receivers. The ODATA packets are sequentially numbered to enable the receivers to detect if any packet is lost in transit. For purpose of providing reliable delivery of the multicast data, the sender 72 retains an amount of the recently transmitted data in a transmit window 82 for data repairs in case some ODATA packets do not reach each of the receivers. When a receiver 74 detects that it has not received a packet or packets in the sequenced ODATA packets transmitted by the sender based on their sequence numbers, it may send a negative acknowledgment (NAK) 84 to the sender 72 requesting for the data packet(s) it detected to be missing. The process of sending the NAK is described in greater detail below with reference to FIG. 5.

When the sender 72 receives the NAK 84 for the data lost in transmission, it first checks whether the requested data are in its transmit window 82. If the data are in the transmit window 82, the sender immediately returns an "NAK confirmation" (NCF) packet 88, and subsequently multicasts the requested data in repair data (RDATA) packets 90 to the receiver 74. On the receiver side, when the receiver 74 receives the NCF 88, it waits to receive the RDATA packets 90 transmitted by the sender. If, however, the RDATA does not arrive within a timeout period hereinafter called the "NCF-RDATA timeout," the receiver repeats its request for the missing data by resending the NAK.

Figure 3:
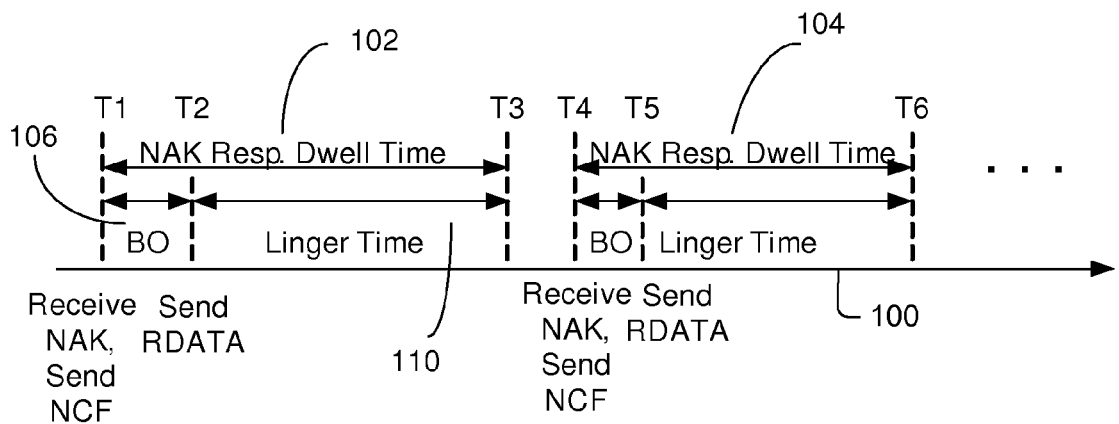
FIG. 3 is a schematic diagram showing a timeline for the sender to respond to negative acknowledgments for packets lost in transit.

Referring now to FIG. 3, in accordance with an important aspect of the invention, the sender 72 (shown in FIG. 2) does not respond to each one of the NAKs for a given lost packet, which may have been repeatedly sent by one receiver or may come from different receivers in the multicast group, by sending a corresponding repair data packet. Instead, as illustrated by the timeline 100 in FIG. 3, after receiving the first NAK at time T1, the sender first responds to the NAK by sending a NCF immediately, and then enters a back-off (BO) period before sending out the requested RDATA. In the back-off period, if the sender receives other NAKs for the same sequence number, it responds by sending respective NCFs. At the expiration of the back-off period, the sender sends out the RDATA at T2, and then enters another period called the "linger time," in which it does not respond to any NAK for the same sequence number. The back-off time 106 and linger time 110 together form a time period 102 hereinafter called the "NAK response dwell time." Thus, the sender transmits the repair data (RDATA) only once per NAK response dwell time. This serves the important function of fending off "denial-of service" (DOS) attacks. It also allows the sender to conserve its resources as well as network bandwidth by avoiding resending RDATA packets unnecessarily.

After the expiration of the NAK response dwell time 102, if the sender receives another NAK for the same lost data at time T4, the sender starts another NAK response dwell time 104. As will be described in greater detail below, the lengths of the back-off time and the linger time in each NAK response dwell time are dynamically adjusted based on an estimate of how much longer the requested repair data will be retained in the transmit window 82 of the sender.

In accordance with another important aspect of the invention, the NCF-RDATA timeout for the receiver to wait for the RDATA after receiving a matching NCF and before resending the NAK is also dynamically adjusted. The adjustment of the NCF-RDATA timeout is based on the statistical average time (called the "average RDATA time") between receiving a NCF from the sender and receiving the corresponding RDATA for that NCF, and the sender's transmit window size, which the receiver estimates if that information is not directly available under the multicast transport protocol. The ways the linger time on the sender side and the NCF-RDATA timeout on the receiver side are adjusted in an embodiment of the invention are described in greater detail below.

Figure 4:
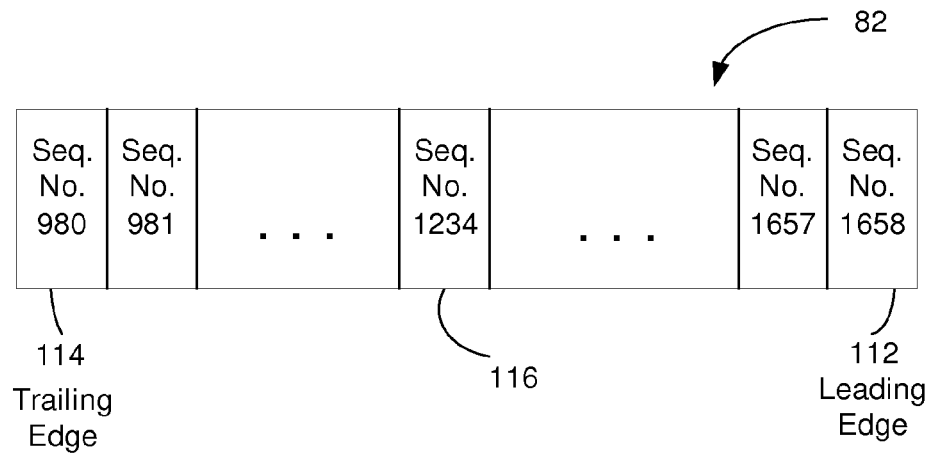
FIG. 4 is a schematic diagram showing a transmit window of the sender for retaining transmitted data for data repairs.

Turning first to the setting of the linger time in the NAK response dwell time, as shown in FIG. 3, after receiving a NAK, the sender responds immediately with a NCF but waits for the back-off time 106 before sending the corresponding RDATA. Such a back-off time before transmitting the RDATA is typically recommended to allow time for consolidation of NAKs for the same data by the sender as well as by network elements (routers) that support the PGM protocol. The consolidation allows the system to use a single RDATA packet to address losses on multiple subnets, rather than sending the same repair packet multiple times. After sending the RDATA, the sender waits for the linger time 110 before it will respond to another NAK for the same requested repair data. As mentioned above, the length of the back-off time is dynamically set based on where the requested repair data is in the transmit window of the sender. The transmit window 82 functions as a buffer space for holding a copy of the ODATA recently sent out by the sender. As illustrated in FIG. 4, the data packets in the transmit window are identified by their respective sequence numbers. As sender continues to send out new ODATA packets, the transmit window is continuously advanced such that its leading edge 112 covers the most recently transmitted ODATA. Since the transmit window has a finite size, its trailing edge 114 is also continuously advanced. As the trailing edge of the transmit window moves, packets with sequence numbers prior to that of the trailing edge are flushed out of the transmit window 82 and are no longer available for providing repair data in response to NAKs.

In one embodiment, the NAK response dwell time 102 is set in the session initiation process and fixed during the session, and the back-off time 106 and the linger time 110 are made longer or shorter by adjusting the ratio between the back-off time and the linger time. When an NAK for a certain sequence number (e.g., 1234) is received, the sender checks to see whether the packet with that sequence number is in the transmit window 82. If the requested packet 116 is in the window, the sender determines where the sequence number lies in the transmit window 82. If the sequence number is close to the leading edge 112 of the window, the NAK back-off time is set longer, i.e., the sender waits longer before responding to a NAK for that RDATA, and the linger time is correspondingly made shorter. The reason for setting a longer back-off time is that the ODATA for the sequence number identified in the NAK went out recently, and it might be a while before the corresponding NAKs make their ways upstream from all networks where the loss is detected. A longer back-off time provides more time for the sender and the network elements to consolidate the NAKs before sending the RDATA. On the other hand, if the sequence number of the lost packet identified in the NAK is very close to the trailing edge 114 of the transmit window 82, the back-off time 106 is set to be short. This is because if the sender waits for too long to send the RDATA out there is a significant risk that the trailing edge 114 of the window will be advanced past the requested sequence number, causing the requested data to be flushed out from the transmit window. Also, the corresponding linger time is longer, during which subsequent NAKs for the same sequence number are ignored. This helps in preventing Denial-Of-Service attacks in case someone tries to bog down the sender and prevent the trailing edge from advancing.

In one implementation, the back-off time is set according to the following equation:

Back-off time=NAK_Response Dwell_Time*(NAKseq−Tseq)/(Lseq−Tseq),

Where NAKseq is the sequence number in the NAK, and Lseq and Tseq are the sequence numbers of the leading edge and trailing edge, respectively, of the sender's transmit window. In this equation, the back-off time for a NAK depends linearly on the distance of the sequence number requested packet from the leading edge of the transmit window. It will be appreciated that other functional dependence between the back-off time and the position of the requested sequence number in the window may be used.

In another implementation, besides adjusting the NAK response time, the sender also adjusts its send rate using a tolerance level based on the ratio of repair packets (RDATA) sent versus all data packets (ODATA+RDATA), referred to as the repair index, sent in the last sample period. By way of example, the tolerance level may be set at 7% and the sample period may be 4 seconds. Thus, every 4 seconds, the sender evaluates the percentage of RDATA sent out of all the packets. If that percentage exceeds 7%, the sender decrements the send rate by $1/256$ or some other fraction of the requested send rate. It repeats decrementing the send rate until the RDATA percentage drops to the tolerance level. On the other hand, if the percentage of RDATA packets is below than the tolerance level and if the send rate has been decreased earlier, the sender tries to increment the send rate in similar increments, until the send rate either reaches the tolerance level or returns to the requested send rate. In this way, the sender tries to maintain the requested send rate while observing the tolerance level. The fraction by which to decrement or increment the send rate each time until the repair index reaches the tolerance level is proportional to the variation of the repair index from the tolerance level. If there is a large variation, the fraction can be made larger than $1/256$.

Figure 5:
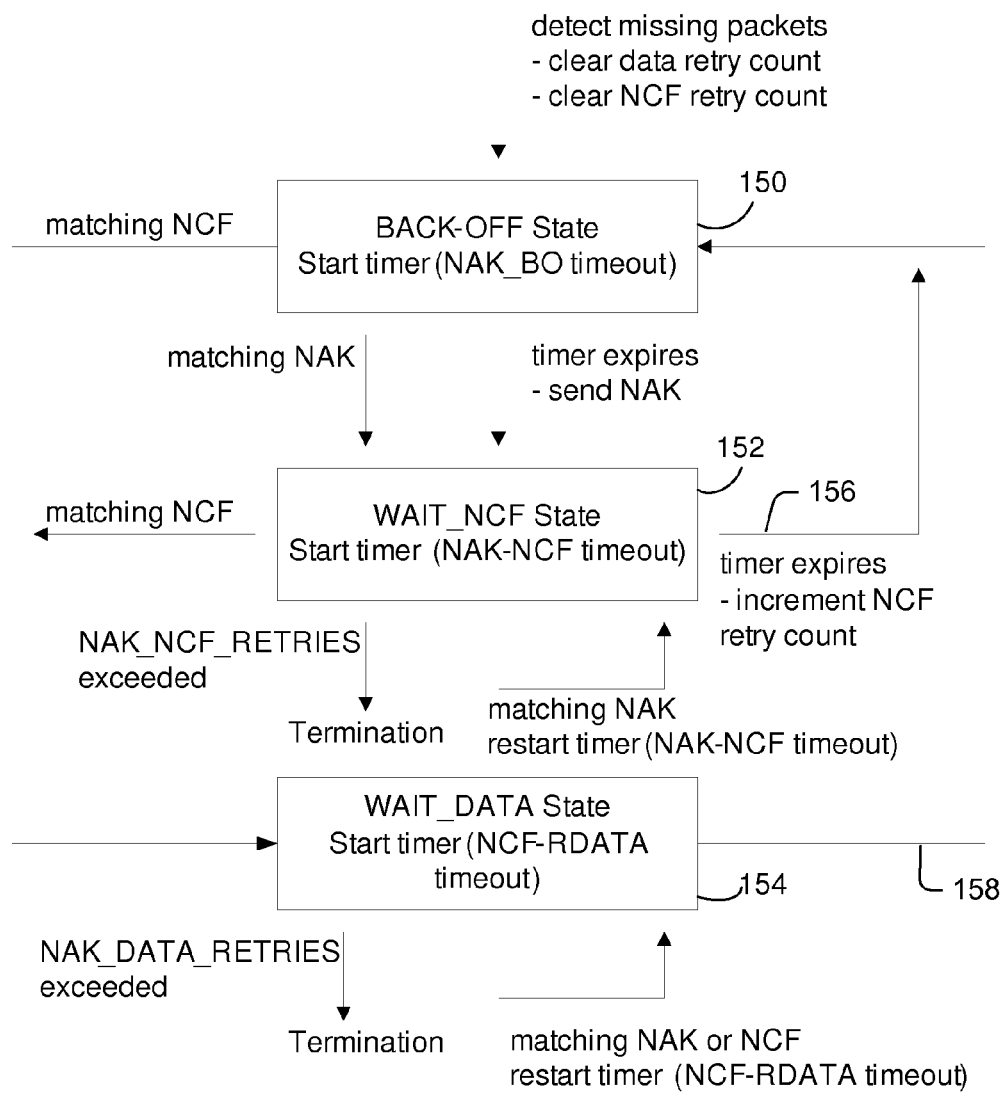
FIG. 5 is a state diagram showing a process in which the receiver resends negative acknowledgments for lost packets.

In accordance with another aspect of the invention, the timeout period for the receiver to wait after receiving a corresponding NCF before resending a NAK is also dynamically adjusted. Referring to FIG. 5, in one embodiment implementing the PGM reliable transport protocol, when the receiver detects a packet loss, it first enters a BACK-OFF state 150 that has a timeout period hereinafter called the NAK back-off timeout. In this back-off period, if the receiver receives a matching NAK (i.e., an NAK for the same sequence number) that is sent out by other recipients of the multicast transmission, there is no need for the receiver to send a NAK for the same data, and the receiver enters directly a "WAIT_NCF" state 152 to wait for a matching NCF. If the receiver receives a matching NCF responsive to a NAK sent out earlier (by another multicast recipient or by the receiver itself), the receiver enters a "WAIT_DATA" state 154 in which it waits for the repair data. If, however, no matching NAK or NCF is received in this back-off period, the receiver sends a NAK for the lost packet, and enters the WAIT_NCF state 152.

In the WAIT_NCF state 152, the recipient waits for another timeout period hereinafter called the NAK-NCF timeout.

If a matching NCF is received in this timeout period, the receiver enters the WAIT_DATA state 154. If, however, the NAK-NCF timeout expires and a matching NCF has not been received, the receiver increments a NCF retry count. If the NCF_retry count has not exceeded a pre-set limit called "NAK_NCF_RETRIES", the receiver goes back 156 to the BACK_OFF state 150 before sending another NAK. If the NAK_NCF_RETRIES has been exceeded, the attempt to recover the lost data is deemed to have failed and the session is terminated.

The WAIT_DATA state 154 has a timeout period called "NCF-RDATA timeout." In this state, if the receiver receives a matching NCF or NAK, it restarts the timer for the NCF-RDATA timeout. If the NCF-RDATA timeout expires and the repair data has not been received, the receiver increments a data retry count and returns 158 to the BACK_OFF state 150, after which another NAK may be sent out as described above. If, however, the data retry count has exceeded a pre-set limit called "NAK_DATA_RETRIES," the session is terminated.

Thus, when the receiver 74 does not receive the requested RDATA 90 within the NCF-RDATA timeout after receiving a matching NCF, it may send out the NAK again under the assumption that the sender did send the RDATA but the RDATA, like the ODATA, was lost in transit. If the receiver waits for too long before resending the NAK, it runs the risk of unrecoverable data loss, because the sender's transmit window may be advanced past the sequence number of the requested data, causing the requested data to be flushed out. On the other hand, if the receiver waits for too little time after receiving the NCF, it may send out another NAK unnecessarily when the sender is preparing to send the RDATA or when RDATA is already in transit. If the second NAK reaches the sender after the sender has already sent the RDATA, it may cause the sender to send another copy of the RDATA. This not only increases the network traffic but also wastes the sender's resources.

In accordance with the invention, the value of the NCF-RDATA timeout is dynamically set based on the history of how quickly earlier RDATA packets from the sender reached the receiver after the corresponding NCFs, and the size of the sender's transmit window. The time by which the RDATA lags behind the NCF depends on a number of factors, such as the network latency, the network loss rate, the number of repair packets preceding the one for a given request that the sender has to process, the sender's send rate limit and back-off time, etc. The statistical average of this time lag between the receipt of a NCF and the receipt of the RDATA associated with the NCF, called the "average RDATA time," tells the receiver roughly when it should expect to receive the RDATA for the current NAK after it has received the matching NCF. The sender's transmit window size in terms of transmission time, on the other hand, tells the receiver how much longer the requested data will be retained by the sender for data repairs. Based on these two factors, the receiver can dynamically adjust the NCF-RDATA timeout to strike a balance between the attempt to avoid resending NAKs too quickly and the need to get the repair data before the sender flushes them out.

In one embodiment, to determine the average RDATA time, each time the receiver receives an NCF packet from the sender for a given sequence number, it starts counting time. The NCF may be generated by the sender in response to a different NAK previously sent by the receiver or by some other receiver in the multicast group. When the receiver receives the RDATA packets corresponding to the NCF, it determines the amount of time between receiving the NCF and receiving the RDATA. In this way, for each NCF and RDATA pair, the receiver obtains one sample of the RDATA time. The RDATA time samples are then averaged to provide the averaged RDATA time. The average RDATA time is updated with the receipt of each new RDATA packet.

As mentioned above, the window size of the sender (in terms of time, e.g., seconds) is also considered in setting the NCF-RDATA timeout. In existing multicast transport protocols, however, the sender sets its own transmit window size, and there is no mechanism for a receiver to know how big the sender's window is in terms of seconds. In other words, the receiver does not know exactly how long the sender will cache the transmitted ODATA for purpose of repairs.

In accordance with a feature of a preferred embodiment, the receiver estimates the window size of the sender in terms of transmission time (e.g., in milliseconds). To that end, the receiver tracks two sets of data—the first set in real time, and the second set at regularly scheduled intervals, such as every 4 seconds. The data that the receiver tracks on a real-time basis include the total bytes received ("TotalBytesReceived"), total sequence numbers received ("TotalSequencesReceived") and the current transmit window size in terms of sequence numbers ("CurrentWindowSizeInSequences"), and the time between receiving a NCF and receiving the corresponding RDATA ("NcfRdataResponseTime"). The number of total bytes received is a simple summation of all the bytes received. The total sequence numbers received is likewise determined. The window size in sequence numbers is obtained from sequence numbers of the leading and trailing edges of the transmit window. This information is typically included in the ODATA and Source Path Message (SPM) packets from the sender.

Periodically, (e.g., every 4 seconds), the receiver uses the real-time data to compute analytical information about the multicast session. The variables computed include "DataRateInLastInterval", "OverallDataRate", "MaxDataRate", "MeanWindowSizeInSequences", "MeanWindowSizeInMilliseconds". The DataRateInLastInterval is calculated by dividing the BytesReceived in the last interval by the length of the interval. The OverallDataRate is calculated by dividing the TotalBytesReceived by the elapsed time since the start of the session. The MaxDataRate is the maximum observed value of the DataRateInLastInterval since the start of the session. The MeanWindowSizeInSequences is calculated by dividing the statistical sum of the CurrentWindowSizeInSequences values by the number of instances. If there are no values for CurrentWindowSizeInSequences, then the last-known leading edge sequence number is used to represent this variable, since the initial trailing-edge sequence number is assumed to be zero. The WindowSizeInMilliseconds is calculated by first determining the value of the variable called AverageBytesPerSequence, which is obtained by dividing the TotalBytesReceived by TotalSequencesReceived. The AverageBytesPerSequence is then multiplied by the MeanWindowSizeInSequences (to obtain an average window size in bytes) and then divided by the MaxDataRate to yield the WindowSizeInMilliseconds, which represents the window size in milliseconds.

Figure 6:
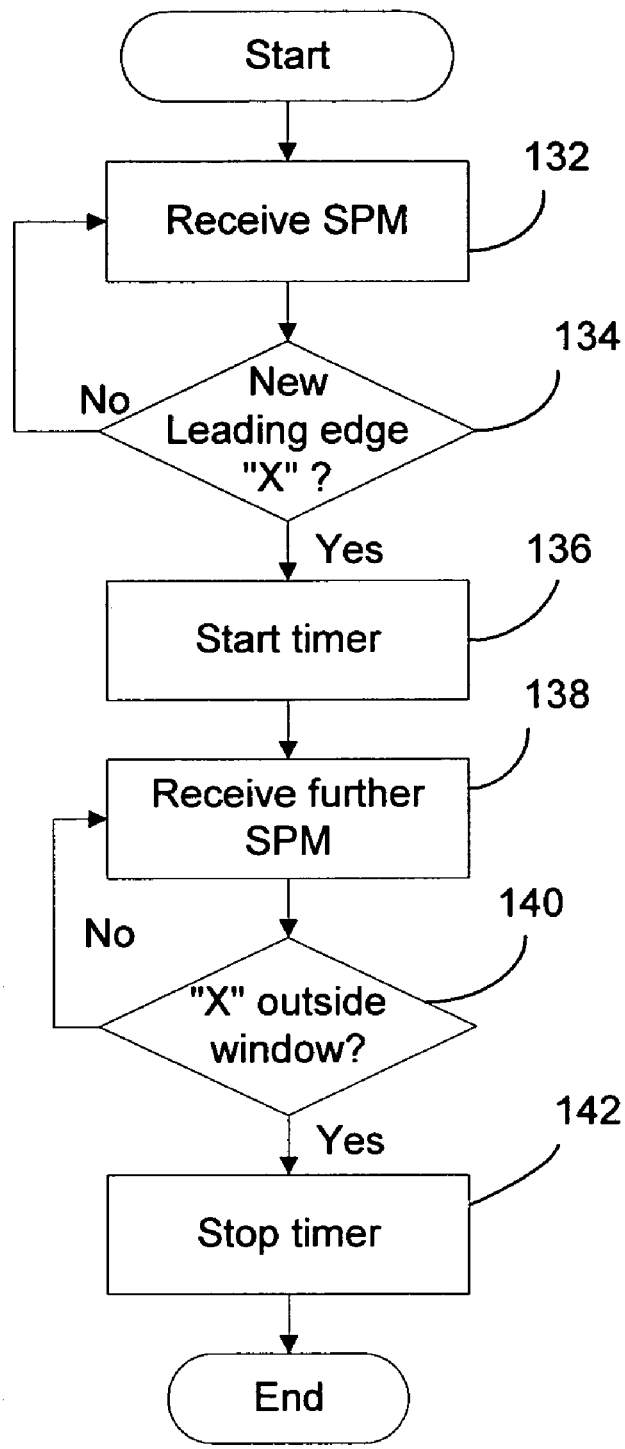
FIG. 6 is a flowchart for a method performed by the receiver to estimate the size of the sender's transmit window.
Figure 7:
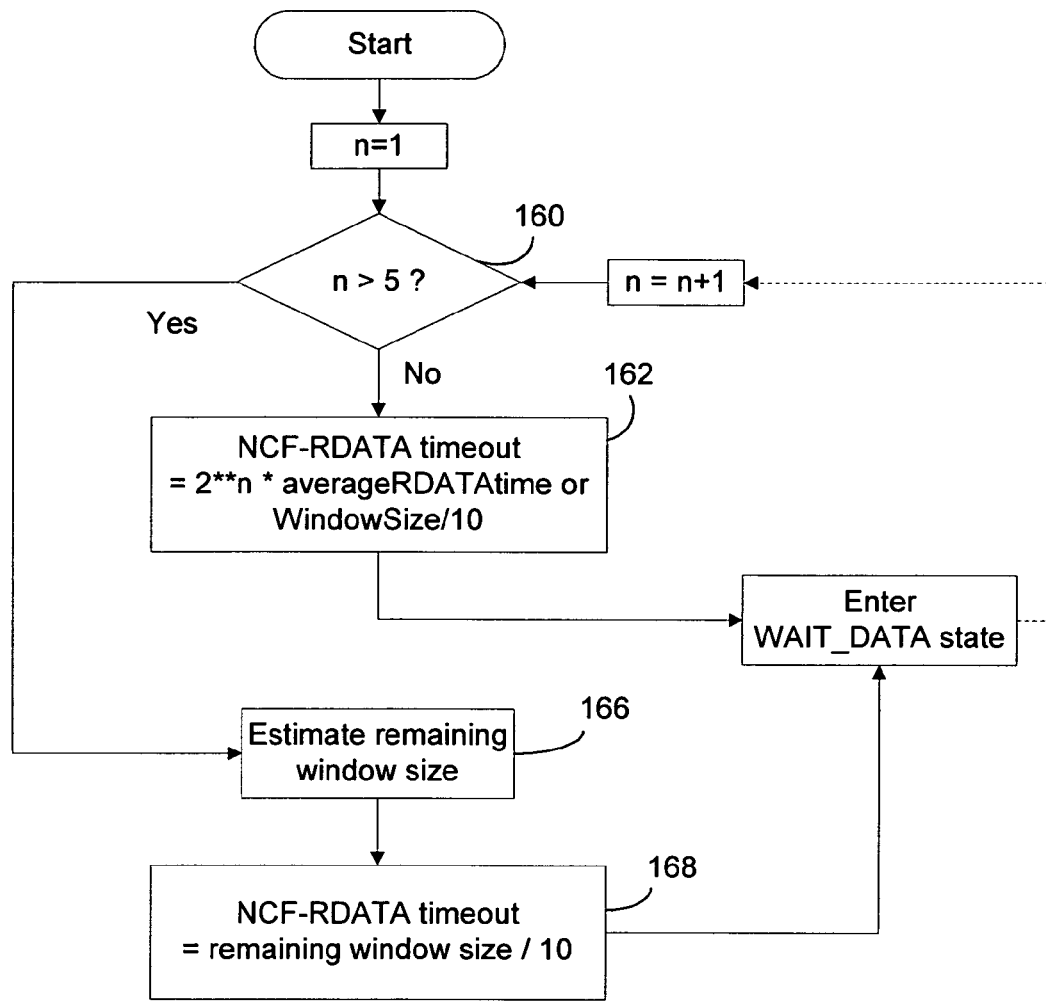
FIG. 7 is a flowchart showing a process performed by a receiver in an embodiment of the invention to set a timeout period to wait for repair data after receiving a NAK confirmation before resending the NAK.

A second way to estimate the sender's window size in terms of seconds is to determine how quickly the window is advanced past a given sequence number. Referring to FIG. 6, when the receiver receives an SPM packet from the sender (step 132), it looks for a leading edge sequence number that is not within the range of sequence numbers (i.e., from the trailing edge to the leading edge) of the previous SPMs. Once such a new leading edge sequence number is found (step 134), the receiver starts counting time (step 136). For discussion purpose, this sequence number is denoted "X" here. As the sender sends out more ODATA and advances its transmit window, the leading edge and trailing edge sequence numbers of the window increase. In the meantime, the receiver continues to receive SPMs from the sender (step 138). When the receiver receives an SPM with a window sequence number range that no longer includes X (step 140), it stops the timer (step 142). In other words, the timing counting is stopped when the sender's transmit window has been advanced past X. The counted time for X to move from being at the leading edge to being passed by the trailing edge is used by the receiver as the sender's window size in terms of milliseconds.

It should be noted that the two methods described above for estimating the sender's window size may have different degrees of accuracy in different scenarios. It may therefore be desirable to use both values to arrive at a better estimate. In one embodiment as described above with reference to FIG. 5, the receiver will go through the WAIT_DATA state up to a total number NAK_DATA_RETRIES that is predetermined for the session. The NAK_DATA_RETRIES may be a preselected fixed number, such as 10, for all multicast sessions, or may be set for the session during session initiation. Knowing how long the sender will keep transmitted data for repairs (i.e., the transmit window size in milliseconds) and statistically how long the RDATA arrives after the NCF (i.e., the average RDATA time) enables the sender to dynamically set the NCF-RDATA timeout to try to void unnecessarily resending the NAK while ensuring that all the allowed data retries are done before the RDATA becomes unavailable.

In one implementation, the NCF-RDATA timeout is set depending on how many times the receiver has gone through the WAIT_DATA state (i.e., the data retry count). The first half of the maximum number of retries (i.e., NAK_DATA_RETRIES) are spaced apart by increasing intervals. In other words, the NCF-RDATA timeout is increased (unless it reaches an upper limit) for each data retry cycle up to half of the total number of data retries. The second half of the retries are then carried out in the remaining time before the required repair data are flushed out of the sender's transmit window. By way of example, referring to FIG. 7, if NAK_DATA_RETRIES is set to 10, then the NCF-RDATA timeout depends on whether the number of data retries is less than or greater then five (step 160). For the first 5 cycles, the NCF-RDATA timeout is set to be $2^{}n$ times the average RDATA time, where n is the number of retries performed, but with the maximum value of the timeout capped at the value of the estimated window size (in milliseconds) divided by 10 (step 162**). Thus, for the first data retry cycle, the timeout is set to be the average RDATA time. Thereafter, in each subsequent data retry cycle up to the fifth cycle, the timeout is generally doubled. By increasing the NCF-RDATA time for each next retry, the receiver gives the sender more time to respond to the last NAK. Note that the average RDATA Time is not a constant since it is continuously updated by the receiver as new RDATA packets in response to other NAKs are received.

In the second half of the data retry cycles, the receiver tries to perform the remaining 5 retries before the sender flushes the requested data from the sender's window. To this end, the receiver determines the remaining window size (i.e., the estimated window size in milliseconds minus the time that has already elapsed since the time the receiver detected the packet loss) (step 166). The receiver than sets the NCF-RDATA timeout for the remaining 5 retries to be the remaining window size divided by 5 (step 168). If, for some reason, the transmit window of the sender advances beyond the sequence number of the packet the receiver is trying to recover before the 10 cycles are completed, the session is terminated as unrecoverable.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method to facilitate multicast transmission, the method comprising:

receiving a negative acknowledgment from a receiver identifying a sequence number of a missing packet of the multicast transmission received by the receiver;

transmitting a confirmation of receipt of the negative acknowledgment;

setting a back-off time and a linger time based on a location of the sequence number within a transmit window maintained by the sender for retaining recently transmitted data of the multicast transmission for data repairs, wherein the response back-off time decreases as the sequence number approaches a trailing edge of the transmit window;

sending repair data for the missing packet after expiration of the back-off time;

waiting for expiration of the linger time after sending the repair data for the missing packet and ignoring other negative acknowledgments for the missing packet received during the linger time; and adjusting a send rate using a predetermined tolerance level, the tolerance level based on a ratio of repair data packets sent versus all data packets sent.

2. The method of claim 1, further comprising evaluating the ratio of repair data packets sent versus all data packets sent at a predetermined sample period, and if the ratio exceeds the tolerance level then decrementing the send rate by a fraction of the requested send rate.

3. The method of claim 2, further comprising decrementing the send rate until the ratio of repair data sent versus all data packets sent does not exceed the tolerance level.

4. The method of claim 2, further comprising evaluating the ratio of repair data packets sent versus all data packets sent at the predetermined sample period, and if the ratio is less than the tolerance level and the send rate was previously decreased then incrementing the send rate until the send rate reaches the tolerance level.

5. The method of claim 1, further comprising determining the back-off time based at least in part on a separation between the sequence number and the trailing edge of the transmit window.

6. The method of claim 1, further comprising determining a response dwell time based on the back-off time and linger time that is constant for a session of the multicast transmission, and determining a ratio of the back-off time to the linger time based on a separation between the sequence number and the trailing edge of the transmit window.

7. A method to facilitate multicast transmission, the method comprising:

receiving original data packets of the multicast transmission from the sender;

detecting a packet missing from the multicast transmission;

sending a negative acknowledgment to the sender identifying the missing packet;

receiving a confirmation matching the negative acknowledgment;

setting a data waiting timeout according to a statistical average time for receiving repair data from the sender and a size of a transmit window maintained by the sender for retaining recently transmitted data of the multicast transmission for data repairs;

waiting for repair data for the missing packet up to expiration of the data waiting timeout, determining whether a cycle of receiving a confirmation, setting, waiting, and resending has been repeated a pre-selected maximum number of times; and resending the negative acknowledgment after expiration of the data waiting timeout if the repair data for the missing packet is not received and the cycle has not been repeated the pre-selected maximum number of times.

8. The method of claim 7, further comprising determining the data waiting timeout based at least in part on a number of retries of the data retry cycle already performed by the receiver.

9. The method of claim 8, further comprising increasing the data waiting timeout based on the number of retries already performed for a first portion of the pre-selected maximum number of retries.

10. The method of claim 9, further comprising determining the data waiting timeout for the first portion of the pre-selected maximum number of retries based on the statistical average time for receiving repair data multiplied by a factor that increases with the number of retries.

11. The method of claim 7, further comprising estimating a size of a transmit window of the sender based at least in part on a transmission time.

12. The method of claim 11, further comprising determining the data waiting timeout based at least in part on the estimated size of the transmit window.

13. The method of claim 12, further comprising determining the data waiting timeout based at least in part on at least of a measurement or estimation of network latency, a measurement or estimation of network loss rate, or a quantity of repair packets preceding a requested repair packet.

* * * * *